(12) United States Patent
Huang et al.

(10) Patent No.: US 8,387,237 B2
(45) Date of Patent: Mar. 5, 2013

(54) DEVICE FOR ASSEMBLING AND DISASSEMBLING INNER SUPPORT OF VEHICLE TIRE

(75) Inventors: Song Huang, Wuhan (CN); Ji Chen, Wuhan (CN)

(73) Assignee: Dongfeng Motor Corporation, Wuhan (CN)

( * ) Notice: Subject to any disclaimer, the term of this patent is extended or adjusted under 35 U.S.C. 154(b) by 749 days.

(21) Appl. No.: 12/495,859

(22) Filed: Jul. 1, 2009

(65) Prior Publication Data

US 2009/0271976 A1 Nov. 5, 2009

Related U.S. Application Data

(63) Continuation of application No. PCT/CN2008/071606, filed on Jul. 10, 2008.

(30) Foreign Application Priority Data

Jul. 19, 2007 (CN) .......................... 2007 1 0052780

(51) Int. Cl.
*B23P 19/00* (2006.01)
*B25B 27/00* (2006.01)
*B30B 5/04* (2006.01)

(52) U.S. Cl. ............. 29/802; 29/235; 29/426.5; 29/270; 29/244; 100/212

(58) Field of Classification Search ................... 29/802, 29/235, 894.3, 426.5, 270, 243.5, 243.517, 29/243.518, 244; 100/3, 8, 13, 32, 33 PB, 100/34, 212; 269/131, 132
See application file for complete search history.

(56) References Cited

U.S. PATENT DOCUMENTS

| | | | |
|---|---|---|---|
| 3,858,631 A * | 1/1975 | Andersson et al. | 144/248.5 |
| 4,565,229 A * | 1/1986 | Larson | 144/154 |
| 7,322,070 B2 * | 1/2008 | Zimmerle et al. | 15/315 |
| 2006/0102265 A1 * | 5/2006 | Wright | 152/158 |

* cited by examiner

*Primary Examiner* — Sarang Afzali
(74) *Attorney, Agent, or Firm* — Matthias Scholl P.C.; Matthias Scholl

(57) ABSTRACT

A device for assembling and disassembling an inner support of a vehicle tire, comprising a supporter, a fastening belt, a retracting device, a securing device, and a gear unit. The retracting device and the securing device are disposed on the supporter. One end of the fastening belt is connected to the retracting device, the other end of the fastening belt is connected to the securing device. The retracting device is connected to the gear unit. The device facilitates assembling and disassembling on demand and allows for a simple and fast disassembling process.

13 Claims, 5 Drawing Sheets

DEVICE FOR ASSEMBLING AND DISASSEMBLING INNER SUPPORT OF VEHICLE TIRE

CROSS-REFERENCE TO RELATED APPLICATIONS

This application is a continuation of International Patent Application No. PCT/CN2008/071606 with an international filing date of Jul. 10, 2008, designating the United States, now pending, and further claims priority benefits to Chinese Patent Application No. 200710052780.4, filed on Jul. 19, 2007. The contents of these specifications are incorporated herein by reference.

BACKGROUND OF THE INVENTION

1. Field of the Invention

The invention relates to a device for assembling and disassembling an inner support of a vehicle tire.

2. Description of the Related Art

Nowadays, inner supports are widely used in vehicle tires so as to assist tires in operating as gas leakage occurs. However, disassembling of the inner support is conventionally done by a hydraulic device, which is relatively heavy and complex and makes it impossible to facilitate assembling and disassembling on demand outside of factory. Moreover, the disassembling process is complex and time-consuming.

SUMMARY OF THE INVENTION

In view of the above-described problems, it is an objective of the invention to provide a device for assembling and disassembling an inner support of a vehicle tire that facilitates convenient, simple, and fast assembling disassembling of vehicle tires on demand.

To achieve the above objective, in accordance with one aspect of the present invention, there is provided a device for assembling and disassembling an inner support of a vehicle tire, comprising a supporter, a fastening belt, a retracting device, a securing device, and a gear unit; wherein the retracting device and the securing device are disposed on the supporter, one end of the fastening belt is connected to the retracting device, the other end of the fastening belt is connected to the securing device, and the retracting device is connected to the gear unit.

In another class of this embodiment, the retracting device comprises a shaft having an input end connected to the gear unit, and the shaft is connected to the supporter.

In another class of this embodiment, the device further comprises a manual device or electric device.

In another class of this embodiment, the device further comprises a manual or electric device.

In another class of this embodiment, an input shaft of the gear unit is connected to the manual or electric device.

In another class of this embodiment, the manual device comprises a sleeve, a swing arm and a handle.

In another class of this embodiment, one end of the sleeve receives an axis of the worm; the other end of the sleeve is connected to one end of the swing arm; and the other end of the swing arm is connected to the handle.

In another class of this embodiment, a rolling ball is disposed on an axle end face of the input shaft of the gear unit.

In another class of this embodiment, the input shaft is disposed in a base, and the rolling ball is disposed between the axle end face of the input shaft and inner bottom surface of the base.

In another class of this embodiment, the gear unit is disposed in a housing.

In another class of this embodiment, the securing device comprises one or more guide rods disposed on the supporter.

In another class of this embodiment, the securing device comprises a bracket connected to the supporter and one or more guide rods disposed on the bracket.

In another class of this embodiment, the gear unit comprises a worm wheel, a worm and a worm support, the worm wheel is disposed on the supporter, the worm wheel is engaged with the worm, the worm is disposed on the worm support, and the worm support is connected to the supporter.

In another class of this embodiment, the shaft is connected to the worm via a key, a stopping ring is connected to the shaft, and one or more grooves are disposed on the shaft between the stopping ring and the supporter.

In another class of this embodiment, a hand-held device is connected to the supporter.

In another class of this embodiment, the device further comprises a guide device disposed on the supporter.

In another class of this embodiment, the guide device comprises a supporting plate and a guide wheel, one end of the supporting plate is connected to the supporter, the other end of the supporting plate is connected to the guide wheel, and the guide wheel is in the vicinity of the shaft.

In accordance with another aspect of the present invention, there is provided a device for assembling and disassembling an inner support of a vehicle tire, comprising a supporter, a fastening belt, a retracting device, a securing device and a gear unit; wherein the retracting device and the securing device are disposed on the supporter, one end of the fastening belt is connected to the retracting device, the other end of the fastening belt passes the securing device and is connected to the retracting device, and the retracting device is connected to the gear unit.

During operation, the fastening belt is connected to the retracting device, and then fixed to the inner support of the vehicle tire. As the retracting device operates, the fastening belt compresses the inner support so that the inner support greatly deforms and can be easily disposed in the vehicle tire. As the fastening belt is released and then removed from the retracting device, the inner support can be easily disassembled. The device facilitates assembling and disassembling on demand and features simple and fast disassembling process.

BRIEF DESCRIPTION OF THE DRAWINGS

The invention is described hereinafter with reference to accompanying drawings, in which.

DETAILED DESCRIPTION OF THE EMBODIMENTS

Detailed description will be given below in conjunction with accompany drawings.

Figure 1:
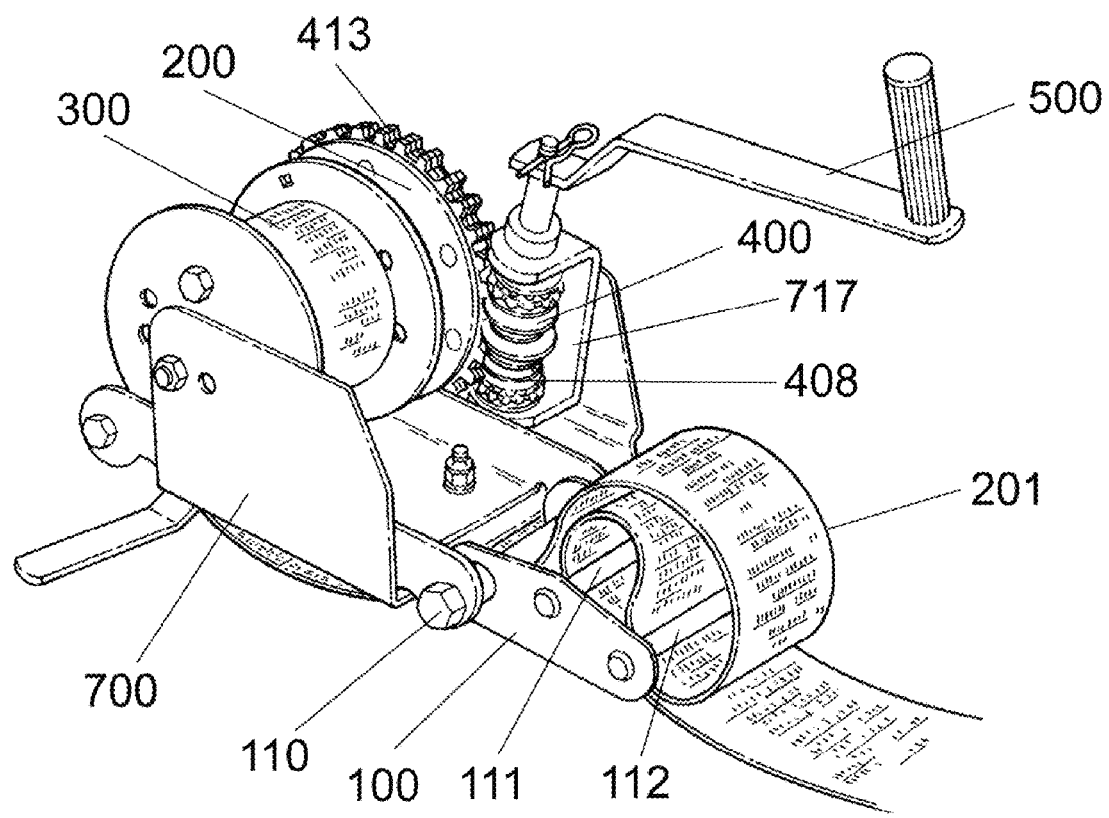
FIG. 1 is a schematic view of a device for assembling and disassembling an inner support of a vehicle tire of an exemplary embodiment of the invention.

As shown in FIG. 1, a device for assembling and disassembling an inner support of a vehicle tire comprises a securing device 100, a retracting device 200, a fastening belt 201, a gear unit 400, and a supporter 700. The retracting device 200 and the securing device 100 are disposed on the supporter 700. One end of the fastening belt 201 is connected to the retracting device 200. The other end of the fastening belt 201 is connected to the securing device 100. The retracting device 200 is connected to the gear unit 400. In another embodiment, the other end of the fastening belt 201 passes the securing device 100 and is connected to the retracting device 200.

The securing device 100 comprises a bracket 110 connected to the supporter 700 and a pair of guide rods 111 and 112 disposed on the bracket 110. The fastening belt 201 is disposed between the guide rods 111 and 112.

The retracting device 200 comprises a shaft 300 having an input end connected to the gear unit 400, and the shaft 300 is connected to the supporter 700.

The gear unit 400 comprises a worm wheel 413, a worm 408 and a worm support 717, the worm wheel 413 is disposed on the supporter 700 and engaged with the worm 408, the worm 408 is disposed on the worm support 717, and the worm support 717 is connected to the supporter 700.

The input shaft of the gear unit 400 is connected to a manual device or an electric device. As the input shaft of the gear unit is connected to the electric device, an output shaft of a motor of the electric device is connected to the input shaft of the gear unit 400, or output shafts of the motor and a speed reducer are connected to the input shaft of the gear unit 400. In this embodiment, the input shaft of the gear unit 400 is connected to a manual device 500.

The gear unit 400 may be a gear transmission mechanism or a worm-gear transmission mechanism. In a case of manual drive, preferably the worm-gear transmission mechanism is used. The gear unit 400 can be disposed in a housing. In this embodiment, no housing is used.

Figure 2:
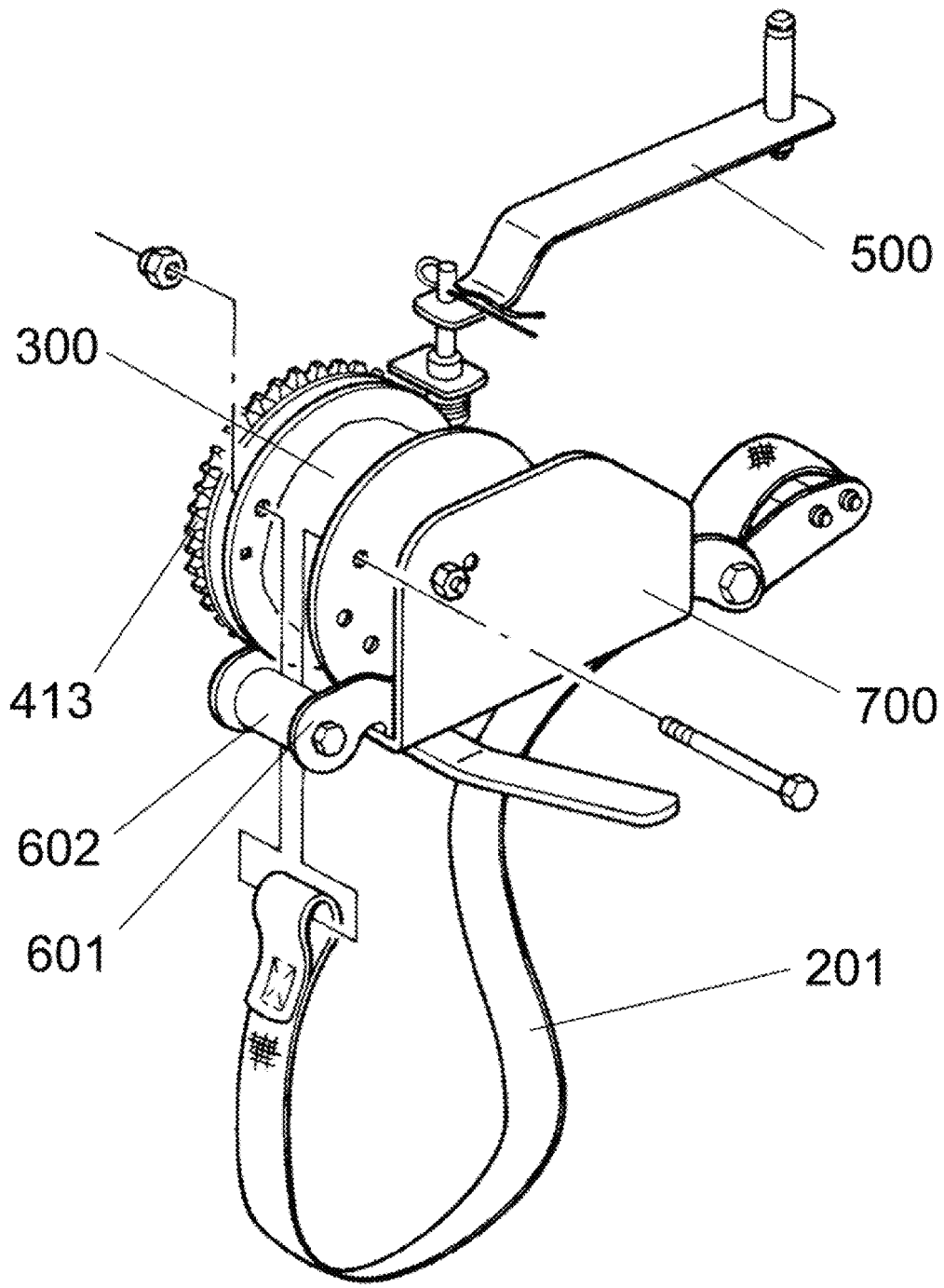
FIG. 2 is an assembly diagram of a fastening belt of an exemplary embodiment of the invention.

As shown in FIG. 2, a guide device is disposed on the supporter 700, and comprises a supporting plate 601 and a guide wheel 602. One end of the supporting plate 601 is connected to the supporter 700, and the other end of the supporting plate 601 is connected to the guide wheel 602. The guide wheel 602 is in the vicinity of the shaft 300.

Figure 3:
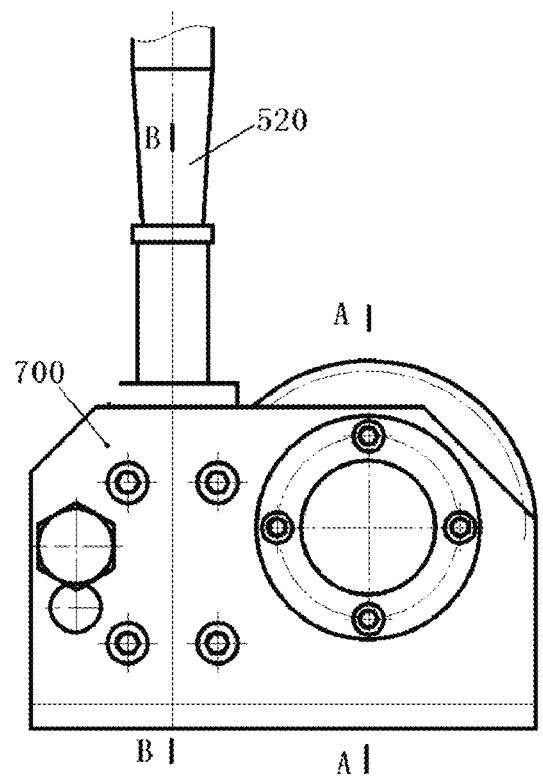
FIG. 3 is a front view of the device for assembling and disassembling an inner support of a vehicle tire of an exemplary embodiment of the invention.
Figure 4:
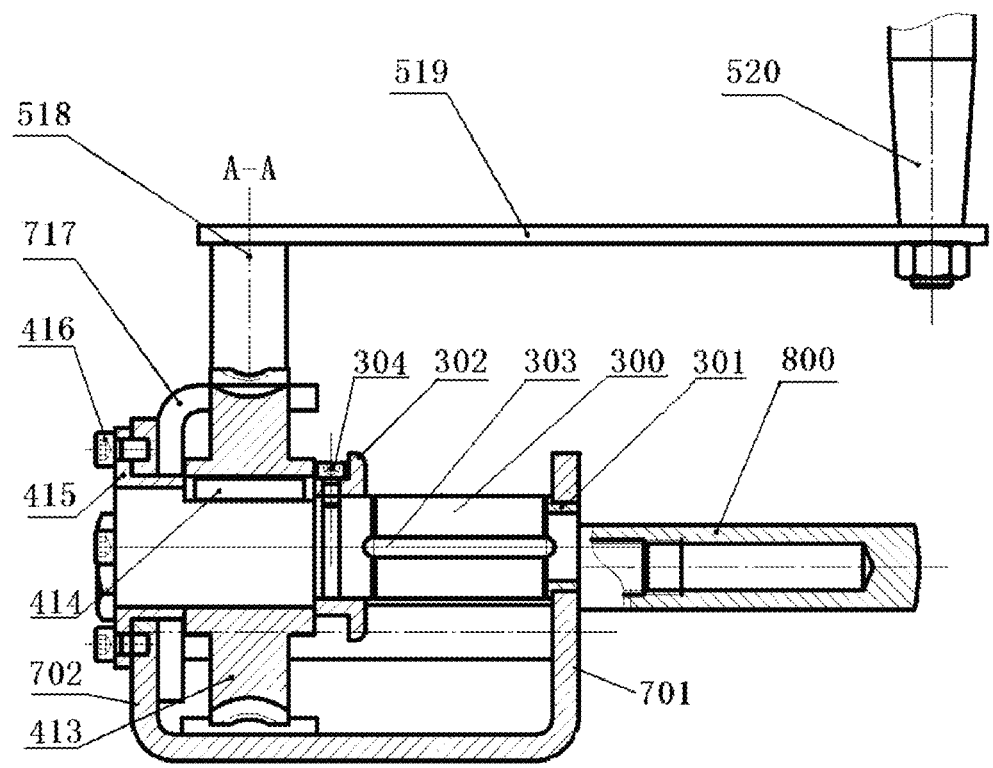
FIG. 4 is a cross-sectional view of the device shown in FIG. 3 along the A-A line.

As shown in FIGS. 3 and 4, a front portion of the shaft 300 is connected to a hole of the worm wheel 413 via a key 414. A stopping ring 302 is connected to the shaft 300, and one or more grooves are disposed on the shaft 300 between the stopping ring 302 and the wall 701. In this embodiment, one groove 303 is disposed on the shaft 300. One or both ends of the fastening belt 201 are disposed in the groove 303, and the stopping ring 302 is fixed on the shaft 300 via a screw 304. Both ends of the shaft 300 are connected to both walls 701 and 702 of the supporter 700. The worm wheel 413 is connected to a journal lid 415 via a bolt 416. A bearing 301 is disposed between the wall 701 and the fastening belt 300.

Figure 5:
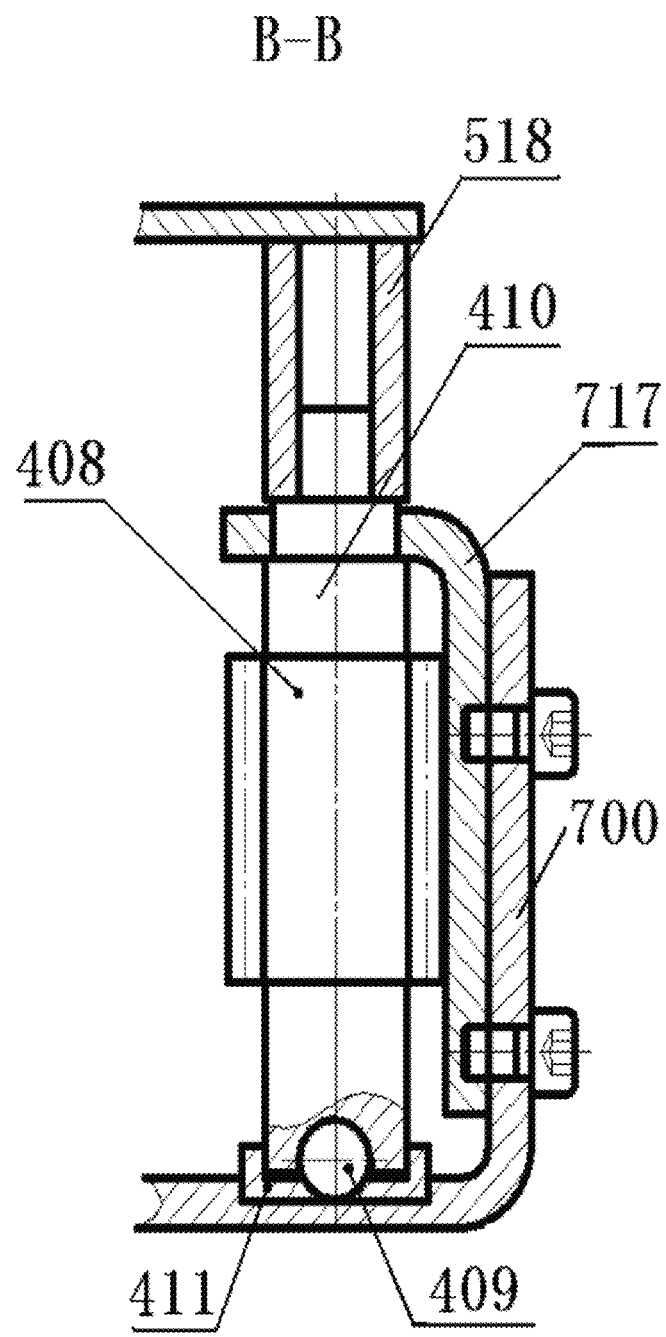
FIG. 5 is a cross-sectional view of the device shown in FIG. 3 along the B-B line.

As shown in FIG. 5, the manual device 500 comprises a sleeve 518, a swing arm 519 and a handle 520. One end of the sleeve 518 receives an axis 410 of the worm 408, the other end of the sleeve 518 is connected to one end of the swing arm 519, and the other end of the swing arm 519 is connected to the handle 520.

A hand-held device 800 is connected to the supporter 700. In a case of manual driving, the hand-held device 800 applies a counter-torque on the device.

A rolling ball 409 is disposed on an axle end face of the input shaft of the gear unit 500. The worm 408 is disposed on the worm support 717. The worm support 717 is connected to the supporter 700. The bottom of the worm 408 is disposed in a base 411, and the rolling ball 409 is disposed between the axle end face of the worm 408 and inner bottom surface of the base 411.

Figure 6:
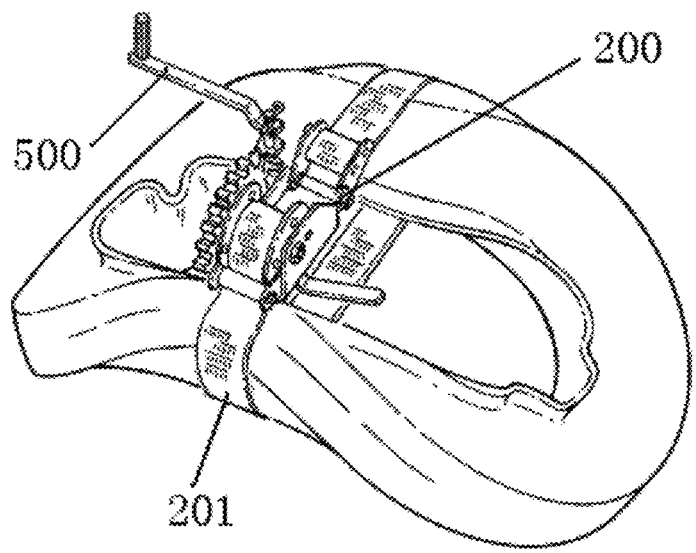
FIG. 6 is illustrates inner support of a vehicle tire being compressed by the device for assembling and disassembling an inner support of a vehicle tire of an exemplary embodiment of the invention.
Figure 7:
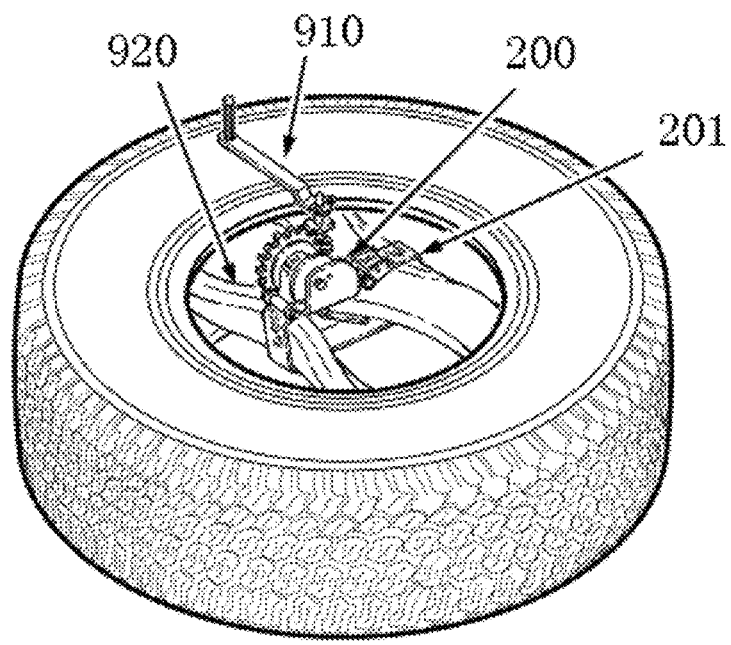
FIG. 7 is illustrates inner support of a vehicle tire being compressed by the device for assembling and disassembling an inner support of a vehicle tire of an exemplary embodiment of the invention and inserted into a vehicle tire.

As shown in FIGS. 6 and 7, during operation, the fastening belt 201 is connected to the retracting device 200, and then fixed to the inner support 920 of the vehicle tire 910. As the retracting device 200 operates, the fastening belt 201 compresses the inner support 920 so that the inner support greatly deforms and can be easily disposed in the vehicle tire 910. As the fastening belt 301 is released and then removed from the retracting device 200, the inner support 920 can be easily disassembled. The device facilitates assembling and disassembling on demand and allows for a simple and fast disassembling process.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

The invention claimed is:

1. A device for assembling and disassembling an inner support of a vehicle tire, the device comprising:
    a supporter;
    a fastening belt comprising a first end and a second end;
    a retracting device;
    a rolling ball;
    a base comprising an inner bottom surface;
    a securing device; and
    a gear unit, said gear unit comprising a worm wheel, a worm, and a worm support; said worm comprising a bottom; and said bottom comprising an axial end face;
wherein:
    said retracting device and said securing device are disposed on said supporter;
    said worm wheel is disposed on said supporter;
    said worm wheel is engaged with said worm;
    said worm is disposed on said worm support;
    said worm support is connected to said supporter;
    said bottom is disposed in said base;
    said rolling ball is disposed between said axial end face and said inner bottom surface;
    said first end is connected to said retracting device;
    said second end is connected to said securing device; and
    said retracting device is connected to said gear unit.

2. The device of claim 1, further comprising a manual device or an electric device.

3. The device of claim 2, wherein said worm is connected to said manual device or said electric device.

4. The device of claim 3, wherein said manual device comprises a sleeve, a swing arm, and a handle.

5. The device of claim 4, wherein:
    said sleeve comprises a third end and a fourth end;
    said swing arm comprises a fifth end and a sixth end;

said third end receives an axis of said worm;
said fourth end is connected to said fifth end; and
said sixth end is connected to said handle.

6. The device of claim 1, further comprising a guide device disposed on said supporter.

7. The device of claim 6, wherein:
said guide device comprises a supporting plate and a guide wheel;
said supporting plate comprises a seventh end and an eighth end;
said seventh end is connected to said supporter; and
said eighth end is connected to said guide wheel.

8. The device of claim 1, wherein said retracting device comprises a shaft having an input end connected to said gear unit, and said shaft is connected to said supporter.

9. The device of claim 1, wherein said gear unit is disposed in a housing.

10. The device of claim 1, wherein said securing device comprises one or more guide rods disposed on said supporter.

11. The device of claim 1, wherein said securing device comprises a bracket connected to said supporter and one or more guide rods disposed on said bracket.

12. The device of claim 1, wherein
said shaft is connected to said worm wheel via a key;
a stopping ring is connected to said retracting device; and
one or more grooves are disposed on said shaft between said stopping ring and said supporter.

13. The device of claim 1 further comprising a hand-held device, wherein said hand-held device is connected to said supporter.

* * * * *